United States Patent
Cordani

(10) Patent No.: US 11,162,846 B2
(45) Date of Patent: Nov. 2, 2021

(54) HOSE NOZZLE TEMPERATURE INDICATOR

(71) Applicant: Peter Cordani, Jupiter, FL (US)

(72) Inventor: Peter Cordani, Jupiter, FL (US)

( * ) Notice: Subject to any disclaimer, the term of this patent is extended or adjusted under 35 U.S.C. 154(b) by 249 days.

(21) Appl. No.: 16/549,383

(22) Filed: Aug. 23, 2019

(65) Prior Publication Data

US 2020/0061651 A1 Feb. 27, 2020

Related U.S. Application Data

(60) Provisional application No. 62/721,910, filed on Aug. 23, 2018.

(51) Int. Cl.
*A62C 99/00* (2010.01)
*G01J 5/00* (2006.01)
*B05B 12/00* (2018.01)
*G01J 5/02* (2006.01)
*G01J 5/12* (2006.01)
*G01J 5/04* (2006.01)

(52) U.S. Cl.
CPC ........ *G01J 5/0014* (2013.01); *A62C 99/0072* (2013.01); *B05B 12/004* (2013.01); *G01J 5/0066* (2013.01); *G01J 5/025* (2013.01); *G01J 5/0265* (2013.01); *G01J 5/042* (2013.01); *G01J 5/12* (2013.01)

(58) Field of Classification Search
CPC ..... B05B 12/004; B05B 12/008; B05B 12/12; G01J 5/0066; G01J 5/0014; G01J 5/042; A62C 31/02; A62C 31/22; A62C 37/08
See application file for complete search history.

(56) References Cited

U.S. PATENT DOCUMENTS

| | | | | |
|---|---|---|---|---|
| 3,588,893 A | * | 6/1971 | McCloskey | A62C 99/009 169/61 |
| 5,727,634 A | * | 3/1998 | Ishida | A62C 31/05 169/60 |
| 6,226,996 B1 | * | 5/2001 | Weber | A61B 18/0218 236/51 |
| 9,573,008 B1 | * | 2/2017 | Fletcher | A62C 35/13 |
| 2004/0163827 A1 | * | 8/2004 | Privalov | G08B 17/005 169/46 |
| 2006/0180321 A1 | * | 8/2006 | Yoshida | F04B 49/02 169/13 |
| 2007/0044979 A1 | * | 3/2007 | Popp | G01J 5/0066 169/60 |
| 2012/0061108 A1 | * | 3/2012 | Cerrano | A62C 31/02 169/46 |
| 2013/0186651 A1 | * | 7/2013 | Cerrano | G05D 7/0635 169/16 |
| 2014/0312141 A1 | * | 10/2014 | Ravishankar | B05B 1/3026 239/63 |

(Continued)

*Primary Examiner* — Joseph A Greenlund
(74) *Attorney, Agent, or Firm* — McHale & Slavin, P.A.

(57) ABSTRACT

An improved nozzle for use with a fire hose having an infra-red temperature sensor that is aligned with an output of the nozzle. The sensor will detect the infrared energy produced by a fire hot spot and provide a visual indication of the energy on a display. The temperature sensor operates a thermometer and is placed in the center of the discharge nozzle allowing water to pass around the sensor. A laser is positioned next to the sensor on the outlet of the nozzle to project a high intensity visible light toward the area that the IR sensor is directed.

7 Claims, 2 Drawing Sheets

(56) References Cited

U.S. PATENT DOCUMENTS

| | | | |
|---|---|---|---|
| 2017/0319882 A1* | 11/2017 | Hart | A62C 31/28 |
| 2019/0099631 A1* | 4/2019 | Hart | A62C 35/68 |
| 2019/0234054 A1* | 8/2019 | Strushensky | B05B 12/10 |
| 2019/0321668 A1* | 10/2019 | Lee | A62C 37/46 |
| 2020/0061651 A1* | 2/2020 | Cordani | A62C 31/03 |

* cited by examiner

HOSE NOZZLE TEMPERATURE INDICATOR

PRIORITY APPLICATION

In accordance with 37 C.F.R. § 1.76 a claim of priority is included in an Application Data Sheet filed concurrently herewith. Accordingly, the present invention claims priority to U.S. Provisional Patent Application No. 62/721,910 entitled "HOSE NOZZLE TEMPERATURE INDICATOR," filed Aug. 23, 2018. The contents of the above referenced application is incorporated herein by reference.

FIELD OF THE INVENTION

This invention is related to the field of fire fighting and, in particular, to a fire hose nozzle incorporating a temperature indicator.

BACKGROUND OF THE INVENTION

Known as a firefighter's "weapon," a fire hose coupled to a fluid pump and source of water. The fire hose is used to transfer a large volume of water through a nozzle to penetrate a fire causing the fire to be extinguish as the burning material are cooled and unable to reignite.

The fire hose has a proximal end coupled to either a pressurized source of water such as a community supplied fire hydrant or a firetruck. Attached to a distal end of the fire hose is a nozzle which ideally includes functions such as changing of a spray pattern, automatic adjustment to line pressures, and a lever for shutting off the flow of water.

Nozzles are individually tailored to provide specific features to put out certain fires. Nozzles can be adjusted to reach greater or lesser distances, use greater or lesser pressures, and produce a variety of flow patterns to address the size and type of fire. Although each nozzle has particular features that are preferred by firemen, the goal of any nozzle is to provide the fireman with the ability to extinguish a fire as quickly and efficiently as possible. For instance, a fire may be extremely intense keeping the fireman at a distance wherein a high pressure narrow stream is most advantageous. In another instance a fire may be creating a lot of smoke wherein a low pressure fan pattern is most advantageous.

Nozzles are made in a variety of shapes and sizes but all retain a goal of providing directional guidance of a large volume of water. Fire fighters are trained to use a nozzle for the directing of water to the most appropriate location for extinguishing the fire. The experienced fire fighter anticipates where the hot spot is located and will adjust the nozzle to extinguish the hot spot as quickly as possible. Water not only extinguishes a fire, water operates as a cooling effect and can protect the firefighters from intense heat and smoke.

In the midst of fighting a fire, fireman must endure flames and smoke and unpredictable site specific issues such as structure integrity, explosive fluids, possible victims, and so forth. Water directed to hot spots may immediately turn to steam adding to the poor visibility that accompanies a fire. Even with years of experience, a firefighter may not be directing water to the most intense heat spot. Opening of doors that are holding back high heat can further lead to back drafts subjecting the firefighter to a life threatening conditions.

What is lacking in the industry is a nozzle for use with fire hoses that includes an infrared temperature sensor to assist in detecting heat spots.

SUMMARY OF THE INVENTION

Disclosed is an improved nozzle for use with a fire hose. The nozzle employs an infrared temperature sensor that is aligned with the nozzle output. The sensor will detect the infrared light produced by a hot spot and provide a visual indication of the temperature. The temperature sensor is placed in the center of the nozzle allowing water to pass around the sensor. Alternatively the temperature sensor can be secured to an outer surface of a conventional nozzle.

The display is preferably a digital readout placed on the nozzle and/or coupled to a Heads-Up-Display on the mask of the fireman. Additionally the display can be color coded wherein a blue color indicates a safe temperature, a yellow color indicates a cautionary temperature, and a red color indicates a dangerous temperature. A fireman may use the device to focus on a hot spot using only enough water to drop the temperature to a cautionary or safe level thereby using water more efficiently. A laser positioned next to the sensor on the outlet of the nozzle projects a high intensity visible light toward the area so a firefighter can determine direction with or without fluid flow.

By incorporating an infrared thermometer-type device into a fire nozzle, an accurate temperature reading of a fire will be displayed as the fireman points the nozzle. Displayed temperatures of fires will allow the firefighter to instantly determine the effectiveness of the application making it a more efficient and effective way to put fires out.

An objective of the invention is to increase safety while extinguishing fires by providing a nozzle with a built-in infrared thermometer and a laser pointer. The thermometer provides an instantaneous reading of a hot spot and the laser pointing through the smoke and haze to indicate the hot spot.

Another objective of the invention is to provide firefighters with a device for reading hot spot temperatures to determine the effectiveness of the water or fire suppressant being applied.

Still another objective of the invention is to provide firefighters with situational awareness of a hot spot both by providing a temperature display having a heat index allowing a firefighter to visual depict the intensity of the hot spot.

Another objective of the invention is to teach the use of a temperature display to notify firefighters on how much or how little water pressure should be applied. The temperature display provides a digital indication of the intensity of the fire.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
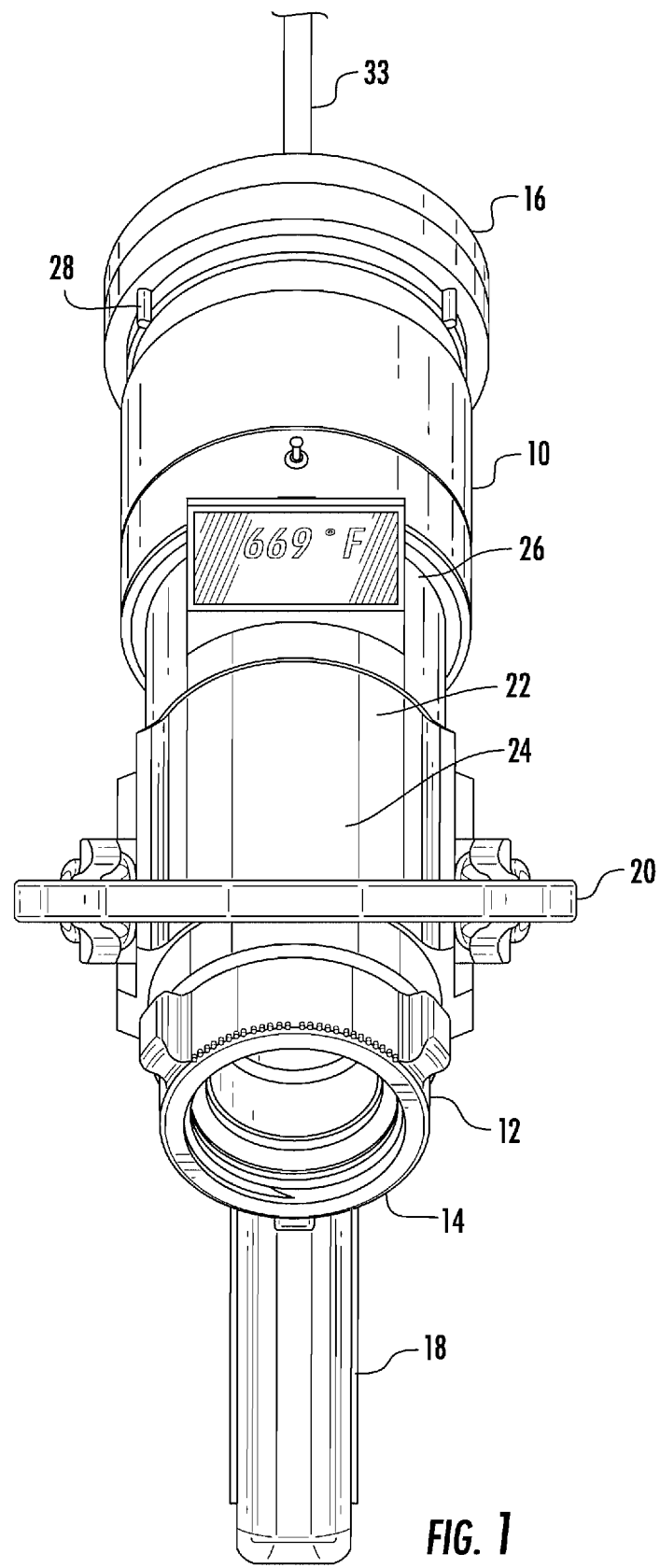
FIG. 1 is a pictorial view of a nozzle incorporating a temperature display.
Figure 2:
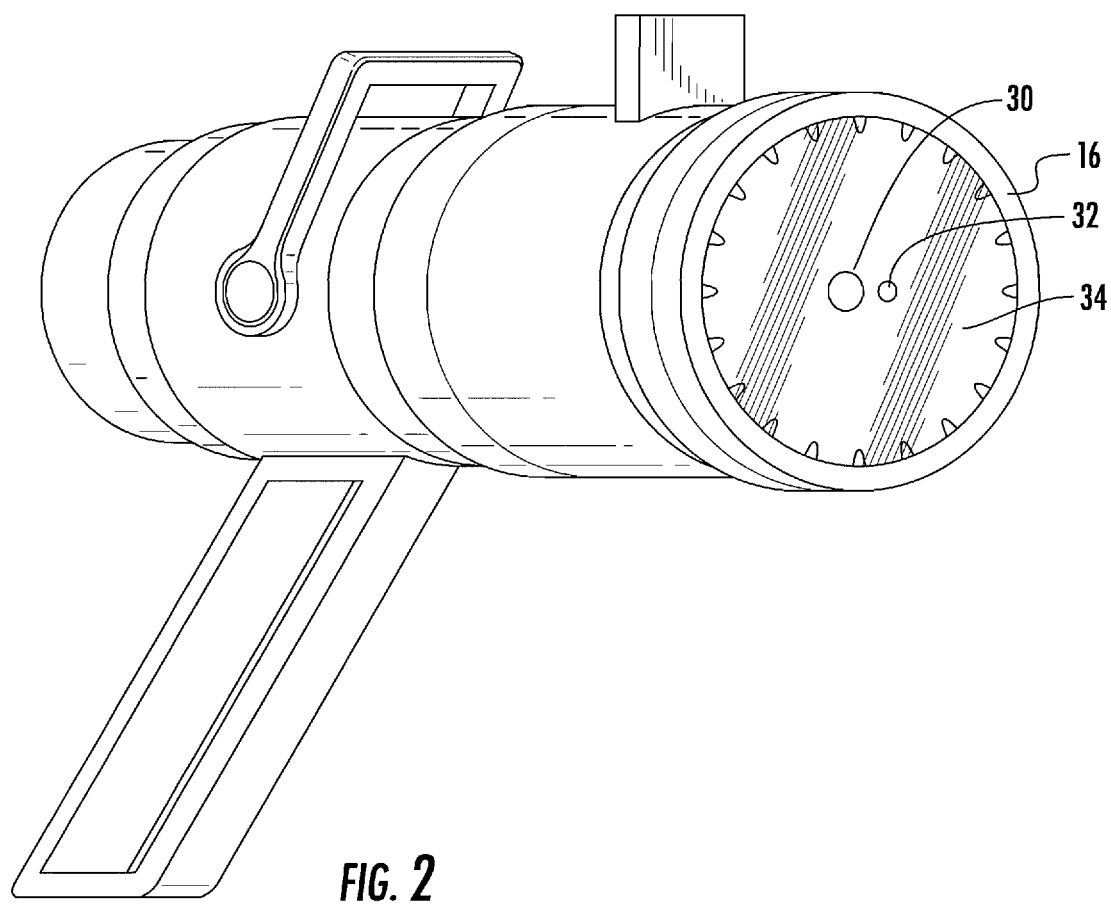
FIG. 2 is a perspective view of the nozzle illustrating the location of the temperature sensor and laser.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Now referring to the Figures, the present invention is an improved nozzle 10 formed from a circular shaped body 12 with an inlet 14 and outlet 16. The nozzle includes a pistol grip handle 18 and a pivoting level arm 20 which is pivoted from an open position 22 to a closed position 24 as necessary. A screen 26 is used to display a heat index in either temperature, color, or both.

The outlet 16 includes an adjustable orifice 28 that can be modified to adjust to the pattern and volume of water dispensed. An infrared sensor 30 is centrally located to detect the infrared energy given off by a heat source directly in front of the outlet 16. A laser 32 is positioned adjacent to the infrared sensor providing a directional visible light at the point the infrared sensor 30 is detecting the infrared energy. The laser operates as a pointer, the infrared detector measures molecules wherein the faster a molecule vibrates; the more invisible light is produced in the form of infrared energy. The infrared sensor operates a thermometer to measure the infrared energy given off by a fire and converts the infrared energy it measures into an electrical signal which is then displayed as a temperature.

Infrared energy has a longer wavelength than visible light and can be measured. The IR thermometer focuses the emitted infrared energy from a hot spot onto a detector. The detector converts the emitted infrared energy into an electrical signal, which the thermometer turns into either a color image or a digital temperature reading. For instance, a display can be colored red to indicate a hot spot that must be extinguished, yellow can indicate a potential or diminishing hot spot, and blue can indicate an area that need not be treated. Alternatively the display can produce a digital reading of the hot spot temperature wherein the fireman can interpret the criticality of treatment. The display can be mounted on the nozzle or by use of Bluetooth displayed within a mask or the like heads-up-display worn by the firefighter.

The nozzle 10 placed on the distal end of a fire hose is considered one of the most important weapons at the firefighter disposal when combating an unpredictable fire. The nozzle 10 can be a conventional fog nozzle or have a fixed or selectable gpm setting. The settings correspond to a particular discharge orifice, or tip size. For instance, in order for a conventional nozzle to operate at the correct nozzle pressure, the proper water flow must be supplied. In a preferred embodiment, water is admixed with a dehydrated super absorbent polymer from GelTech Solutions using an educator. An automatic nozzle will adjust itself automatically to the rating of the educator.

In a preferred embodiment the infrared sensor is located in the middle of the nozzle discharge plate 34; the temperature display 26 reveals the heat index of a fire by translating infrared energy from the hot spot of the fire. The laser 32 illuminates the area that the nozzle is pointed to have the fireman visually determine or otherwise approximate the direction the nozzle is pointed. The infrared sensor 30 then detects the temperature at the location. The temperature is displayed 26 directly on the nozzle 10 or, as the information is relayed to a heads-up display mounted on firefighters display mask, not shown.

The infrared thermometer detects the difference of infrared rays being emitted off an object and the surrounding environment to determine the surface temperature of the object. The thermometer funnels the light coming from the object on fire and funnels that light into a thermopile.

The thermopile consists of several thermocouples connected in series which are used to convert thermal energy into electrical energy. The thermocouples measuring the temperature differential from their junction point to the point in which the thermocouple output voltage is measured. The amount of electricity that is generated by the rays being put out by the heated object is converted into a temperature reading that is displayed.

The infrared thermometer can have either a fixed range or an adjustable range. A fixed range may have a 40:1 providing a distance of around 40 feet away for the firefighter to measure the temperate of a one-foot square area. Temperatures rise during combustion, and flames occur when fuel vaporizes and combines with oxygen. Temperatures about 932 degrees Fahrenheit produce a red glow, and temperatures between 1,112 and 1,832 degrees F. produce red flames. The flames turn orange between 1,832 and 2,192 degrees F. and turn yellow between 2,192 and 2,552 degrees F. At these higher temperatures, the distance of a firefighter from the heat must be balanced with the water pressure available to address a fire. Directing water from a distance provides the safest separation for the firefighter, wherein the adjustability of a water dispensing nozzle becomes a critical factor. The infrared thermometer used to find the hot stop of the fire; the nozzle being adjusted to extinguish the fire at the source revealed by the infrared thermometer. The actual distance-to-spot ratio may be fixed or adjustable.

The nozzle is a critical component for the extinguishing operation. In the preferred embodiment an automatic nozzle is employed which has a fixed or selectable gallon per minute setting. These settings correspond to a discharge orifice, or tip size. In order for a conventional nozzle with a fixed opening to operate at the correct nozzle pressure of 100 psi, the proper gpm flow must be supplied. For example, a selectable gallonage nozzle with settings of 30, 60, 95 and 125 gpm will only deliver those flows of 100 psi of nozzle pressure.

Automatic nozzles greatly simplify pump operation. Since automatic nozzles are designed to operate at 100 psi nozzle pressure, this becomes the minimum starting point for any operation. If a nozzle is not supplied with the rated or selected flow, a weak stream will fail to reach the fire, whereas a strong stream creates excessive nozzle pressure making the hose line more difficult to handle. In the preferred embodiment the nozzle has a stray pattern at a design flow rate that essentially clears the path for the infrared temperature reading.

The automatic nozzle uses a spring connected to a baffle that forms the discharge orifice and is balanced against the water pressure in the nozzle. The pressure-control spring senses any increase or decrease in pressure within the nozzle. It then moves the baffle in or out to maintain a particular tip size necessary to keep the nozzle pressure at 100 psi. Essentially the nozzle is constantly changing tip size to match the water pressure and flow rate supplied.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A hose nozzle temperature indicator comprising:
   a longitudinal flow chamber having a first flow path for generating a flow stream and a second flow path for generating a fog spray;
   a first valve operatively associated with said first flow path for manual regulation of the flow stream;
   a second valve operative associated with said second flow path for manual regulation of the fog spray;
   a handle manually operating said first or second valve;
   an infrared thermometer having a first set of thermocouples to measure thermal energy at a remote distance and a second set of thermocouples to measure thermal energy adjacent said handle, a microprocessor to convert thermal energy of first and second set of thermocouples into electrical energy and convert said electrical energy into a temperature reading, and a display screen secured to said hose nozzle for indicating said temperature reading.

2. The hose nozzle temperature indicator according to claim 1 wherein said remote distance is 40 feet, said first and second thermocouples having a ratio of 40:1.

3. The hose nozzle temperature indicator according to claim 1 wherein each set of thermocouples are in series.

4. The hose nozzle temperature indicator according to claim 1 wherein said display screen includes a red indicator for temperature readings between 932 degrees and 1,832 Fahrenheit.

5. The hose nozzle temperature indicator according to claim 1 wherein said display screen includes a yellow indicator for temperature readings between 1,832 and 2,192 degrees Fahrenheit.

6. The hose nozzle temperature indicator according to claim 1 wherein said display screen includes a yellow indicator for temperature readings between 2,192 and 2,552 degrees Fahrenheit.

7. The hose nozzle temperature indicator according to claim 1 wherein said first set of thermocouples is positioned between said first and second flow path.

* * * * *